June 18, 1946.  H. SUTER  2,402,464

VELOCITY MEASURING SYSTEM

Filed July 12, 1941  4 Sheets-Sheet 1

INVENTOR
HENRY SUTER
BY
Zugelter & Zugelter
ATTORNEYS

June 18, 1946.    H. SUTER    2,402,464

VELOCITY MEASURING SYSTEM

Filed July 12, 1941    4 Sheets-Sheet 2

INVENTOR
HENRY SUTER
BY
Zugelter & Zugelter
ATTORNEYS

June 18, 1946.  H. SUTER  2,402,464

VELOCITY MEASURING SYSTEM

Filed July 12, 1941  4 Sheets-Sheet 3

INVENTOR
HENRY SUTER
BY
Zugelter & Zugelter
ATTORNEYS

June 18, 1946.  H. SUTER  2,402,464

VELOCITY MEASURING SYSTEM

Filed July 12, 1941   4 Sheets-Sheet 4

INVENTOR
HENRY SUTER
BY
ATTORNEYS

Patented June 18, 1946

2,402,464

UNITED STATES PATENT OFFICE 2,402,464

VELOCITY MEASURING SYSTEM

Henry Suter, Cincinnati, Ohio, assignor of one-fourth to William Ockrant, Cincinnati, Ohio Application July 12, 1941, Serial No. 402,257

10 Claims. (Cl. 250—1)

This invention relates to a method and means for determining the relative velocity of two bodies by the use of electro-magnetic waves, preferably of ultra high frequency.

An object of the invention is to provide a method and means for measuring the speed of travel, with respect to the earth, of any moving object capable of reflecting high frequency electro-magnetic waves.

Another object of the invention is to provide a method and means for measuring the speed of travel of a moving object by beating a reflected maximum frequency wave against a minimum frequency wave, which may be another reflected wave or the transmitted wave.

Still another object of the invention is to provide a method and means for measuring the speed of travel, relative to the earth, of widely diversified objects, such as the speed of automobiles, on the ground, aircraft traveling in the air and on the ground, the speed of projectiles fired from a gun, and the like.

Still a further object of the invention is to provide electrical means for automatically and continuously discriminating against all components of an incoming beat frequency except the maximum or minimum components thereof.

Another object of the invention is to provide a novel electrical filter circuit wherein the characteristics of the filter will be varied in accordance with the amplitude and frequency of the incoming beat frequency.

These and other objects are attained by the means described herein and disclosed in the accompanying drawings, in which:

Fig. 4 is a side schematic diagram illustrating one typical application of the present device as used for determining the speed of objects moving over the surface of the earth's surface, such as an automobile or the like.

Fig. 10 is a schematic diagram illustrating the application of the present device for determining the muzzle velocity of guns, mounted on naval vessels and the like.

In practicing the present invention, a radio transmitter is utilized to propagate and disseminate electro-magnetic waves, and a radio receiver tuned approximately to the transmitted frequency is utilized to receive the transmitted waves after being reflected.

In the preferred embodiment of the invention both the radio transmitter and receiver are located on one or the other of the two bodies whose relative rates of travel are being measured.

The transmitted electro-magnetic waves are reflected from various objects which may be fixed and/or moving relative to the transmitter and receiver. The frequency of the waves reaching the receiver after reflection from the body whose relative motion is to be determined, differs somewhat from the frequency of the transmitted frequency, by reason of the well known Doppler effect. This wave is beaten aginst a wave having the frequency of the transmitted wave which may be received either directly from the transmitter or it may be reflected from objects having substantially a zero component toward or away from the transmitter and receiver. The resultant beat frequency is an indication of the relative velocity of the two bodies.

Figure 4:
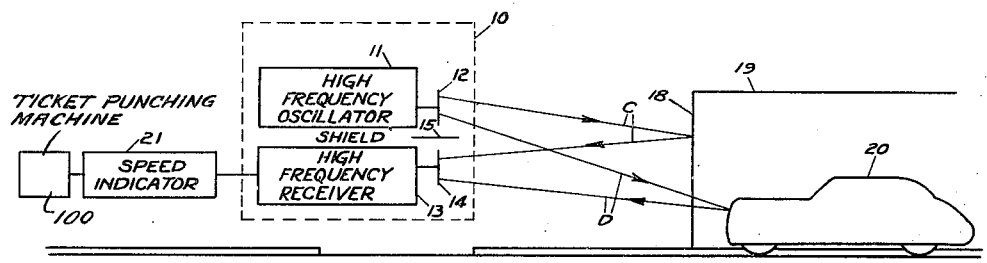
Figure 5:
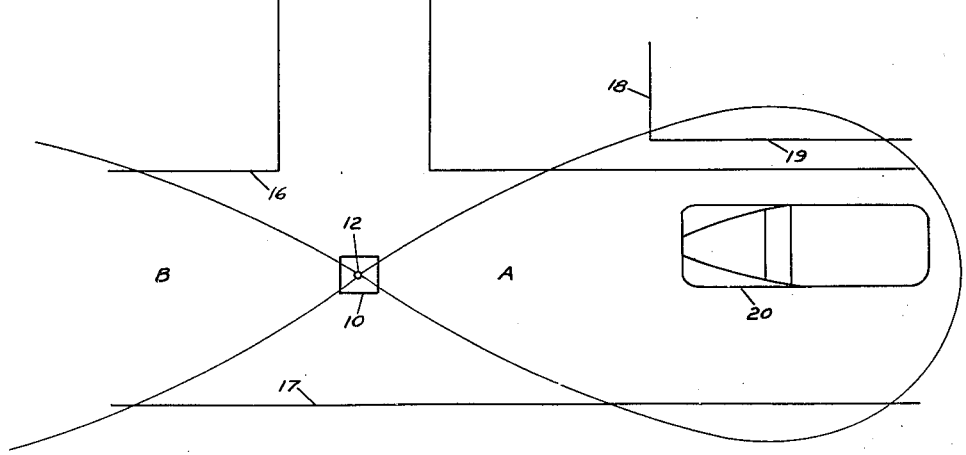
Fig. 5 is a top schematic view of Fig. 4 wherein one type of operating zone is illustrated with respect to the boundaries of a highway.

With particular reference now to Figs. 4 and 5, it will be observed that when used to indicate the speed of vehicular traffic on a roadway, the radio transmitter and receiver may be contained within a suitable housing denoted generally by the numeral 10. The radio transmitter may comprise any suitable high frequency oscillator 11, including an antenna 12, and the receiver may comprise any suitable high frequency receiver 13 such as is illustrated in "Radio Handbook," eighth edition, copyright 1941, Editors and Engineers Limited, pages 395 to 398, including an antenna 14. Preferably, though not necessarily, an electrical shield, denoted generally by the numeral 15, may be interposed between the transmitting and receiving antennae, as illustrated.

Experiment has indicated that when housing 10 is suspended over a roadway, the opposed parallel side edges of which are indicated by the numerals 16 and 17 respectively, the path of the transmitted radio frequency electro-magnetic waves will, under certain conditions, assume the paths indicated by the closed loops A and B. The radiated waves are reflected from various objects, located within the confines of loops A and B, whether such objects be stationary or moving, and a portion of the reflected electro-magnetic waves will be received over the receiving antenna 14. In those instances when all of the received waves are reflected from stationary objects, the strength of the resultant wave entering receiver 13, will depend upon and be a function of the strength and phase angle relationships of all of the incoming reflected waves.

With reference to Fig. 4, it will be assumed, by way of illustration, that the lineal distance between the transmitter antenna 12 and the receiver antenna 14 be comparatively short in relation to the lineal distance of the waves indicated by the letters C and D, wherein wave C is reflected from wall 18 of a stationary object, such as building 19, and wherein wave D is reflected from a moving object, such as an automobile 20.

It is a well known fact that in order to shorten the path of wave D by one wavelength, the linear distance from vehicle 20 to antennae 12 and 14 must be decreased by one-half wavelength. By way of example, if it be assumed that oscillator 11 be generating a frequency of 300 megacycles per second, or a wavelength of one meter, and if it be further assumed that vehicle 20 be approaching antenna 14 at the rate of one meter per second, then wave D, as measured at the receiving antenna 14, would be 300,000,002 cycles per second. When this wave is beaten against the transmitted wave of 300,000,000 cycles per second, it will produce a beat frequency or note of 2 cycles per second. In other words, the beat frequency or note will be equal to twice the velocity of the vehicle divided by the wave length, assuming, of course, that the direction of vehicular travel is parallel with the longitudinal axis of loops A and B of Fig. 5. By locating the transmitting and receiving equipment close to the roadway, such as alongside of the roadway or suspended over the roadway, as illustrated in Fig. 5, a true speed indication of the rate of travel of vehicles moving toward or away from the device will be given, except for that period of time when the vehicle is passing the antennae.

It will be observed that by using a directive transmitting and/or receiving antennae, the percentage of radiation received from a moving vehicle over that received from other objects can be materially increased, thereby increasing the overall efficiency of the device. The loops A and B of Fig. 5, indicate graphically how the effective operating zones of the device may be controlled by the use of directive antennae.

The beat note produced by a vehicle, or other object, moving through loops A and B, may be used to operate directly any suitable speed indicating device, denoted generally in Fig. 4 by the numeral 21, or the beat note may be first passed through one or more electrical filters. The prime function of such filters would be to select or separate certain beat notes from a variety of frequencies which might be received simultaneously over antenna 14 as the result of the movement of more than one object at different speeds through the electro-magnetic field. To this end I have provided an electrical filter circuit which is adapted to automatically and continuously discriminate against all those components of an incoming beat note or beat frequency except the maximum component thereof.

Figure 1:
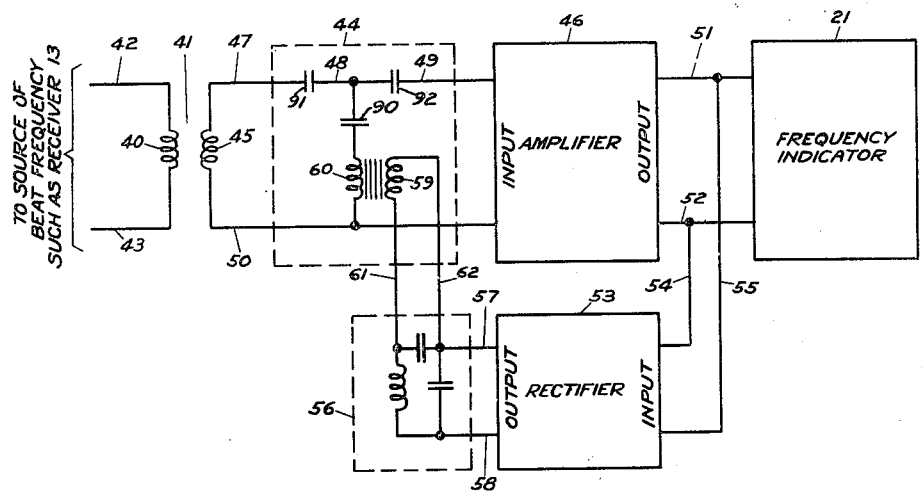
Fig. 1 is a schematic wiring diagram of an electric circuit of the present invention designed to discriminate against all components of an incoming beat frequency except either the maximum or minimum components thereof.
Figure 3:
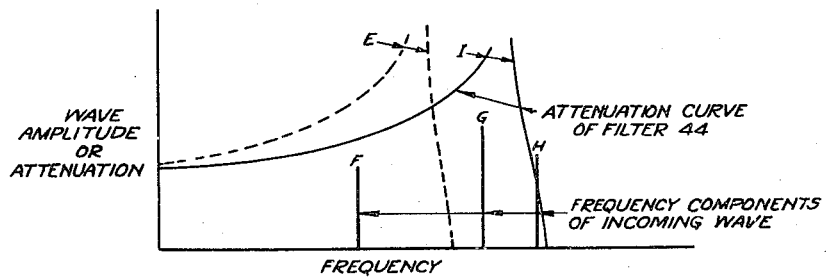
Fig. 3 is a typical attenuation and frequency distribution graph upon which has been superimposed the various frequency components of a typical incoming beat frequency wave.

With particular reference now to Fig. 1, it will be observed that the output from radio receiver 13 is connected to the primary 40 of transformer 41 by means of conductors 42 and 43. Assuming that it is desired to indicate the speed of the fastest moving object through the electro-magnetic field of the device of Fig. 4, it follows that only the maximum frequency of the numerous frequencies comprising the input current to transformer 41 is to be measured on the frequency or speed indicator 21. To this end, a high pass filter, denoted generally by the numeral 44 is electrically coupled between the secondary 45 of transformer 41 and the input side of a suitable amplifier 46, by means of conductors 47, 48, 49 and 50. The attenuation characteristics of filter 44 are graphically illustrated in Fig. 3. If it now be assumed that with no input, the characteristic of filter 44 is indicated by the dotted curve E, of Fig. 3, it will be observed that if a complex wave having frequency components graphically illustrated as ordinates F, G and H is introduced, the frequency component F of the incoming wave would be discarded and waves G and H amplified. The relatively high output voltage from the amplifier may be connected directly to the frequency indicator 21 by means of conductors 51 and 52.

In order to eliminate wave G, thereby permitting only the highest wave H to pass through to the frequency indicator 21, the amplifier output is connected to the input side of a rectifier, denoted generally by the numeral 53, by means of conductors 54 and 55. The output of rectifier 53 may be connected to a filter 56 by means of conductors 57 and 58, in order to eliminate substantially all the ripple in the rectified current. The direct current leaving rectifier 53 is proportional to the voltage at the amplifier output, and this current is connected to winding 59 on the magnetic core of inductance 60 of filter 44, by means of conductors 61 and 62, as shown. The amount of direct current flowing through the windings of coil 59, determines the magneto-motive force, or ampere-turns, which controls and determines the flux density in the core of inductance 60.

Figure 2:
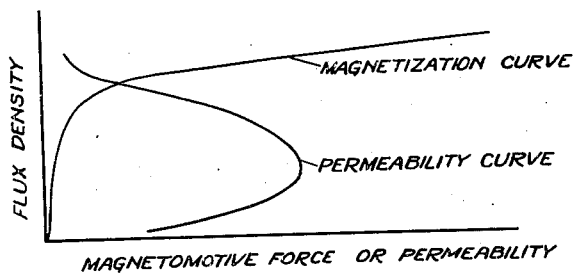
Fig. 2 is a typical magnetization-permeability curve for magnetic materials.

In Fig. 2, a typical magnetization curve is shown wherein the permeability of the magnetic material for any particular flux density is equal to the flux density divided by the magneto-motive force required to produce that flux density. The inductance of a coil having a magnetic core varies with the permeability of the core material, wherefore, it follows that the value of the inductance 60 of filter 44 can be made to vary with the amplifier output voltage. In this manner, a relatively large output voltage from amplifier 46 may be utilized to change the inductance 60 of filter 44 so as to shift the cut-off frequency to a higher value as indicated by curve I of Fig. 3. In this manner, frequency component G has been effectively and completely eliminated, and in some instances, curve H may be somewhat attenuated to a point where the amount of direct current flowing through inductance 60 is reduced.

From the foregoing, it is apparent that the cut-off frequency is determined by and is a definite function of the output of filter 44 as modified by amplifier 46.

By so designing the high pass filter 44 so that the shape of the attenuation curve at the cut-off frequency is very steep, any given change in the amplitude of the wave component being measured will produce only a small change in the amplifier output voltage and in the filter cut-off frequency.

It will be observed that at any one frequency, a rise in amplitude of the incoming wave will necessarily produce a rise in the amplifier output voltage in order to increase the cut-off frequency. This rise in output voltage may be reduced to a practical minimum by proper filter design, however, it cannot be entirely eliminated. Therefore, a speed indicator operating independently of voltage would be ideal, but the other type may be more practicable.

The use of a standard type of frequency meter requiring a constant operating voltage may be made more practicable by using a transformer or other coupling device between the rectifier input and the amplifier output so that for a given amplifier output voltage the rectified inductance controlling current will increase for increasing frequencies. By this means an impressed signal of constant voltage but variable frequency can be made to change the filter characteristics even though the amplifier output voltage remains constant.

It should be observed that although amplifier 46 is shown connected in the circuit of Fig. 1, such use is merely suggestive, since in those instances where sufficient energy may be delivered from the output of filter 44 to operate directly the frequency indicator 21, the amplifier may be dispensed with.

It should likewise be observed that while the filter illustrated in Fig. 1 has but one inductance coil, in some instances it may be preferable to employ a network having more than one inductance, any or all of which may be controlled by direct current. In this manner, closer control of the various filter characteristics may be exercised.

With reference to Fig. 2, it will be observed that by introducing a normal magneto-motive force, or flux density, to the filter inductance core 60 the normal permeability of the core may be shifted along the permeability curve, whereby further increases in the flux density will either increase or decrease the permeability of the core. Therefore, it will be observed that an increase in the rectifier output may be utilized to either increase or decrease the inductance in the filter 44.

From the foregoing, it is apparent that by utilizing the variable output of filter 44 to produce a variable direct current, and by then using such direct current to control the permeability of the core of inductance 60 of filter 44, I am able to continuously and automatically vary the characteristics of the filter in such a manner that the amount by which the frequency components of the various incoming waves are suppressed is varied, as the voltage of the filter output is increased.

It should be noted that if desired, filter 44 may be changed from a high pass filter to a low pass filter, in which event only the lowest frequencies would be permitted to pass through to the frequency indicator.

From the foregoing, it is apparent that the speed of the fastest moving object through the electromagnetic field of transmitter 11 of Figs. 4 and 5, will be automatically indicated on speed indicator 21, thereby making it possible and commercially practicable to check the speed of moving objects, such as motor vehicles, directly in miles per hour.

In those instances where it is desirable to have the speed indicator indicate only those vehicle speeds which are in excess of the lawful rate of speed, such as by way of example, thirty-five miles per hour, the attenuation characteristics of filter 44 may be designed as to discard the frequency components of all incoming waves except those whose frequency components are equal to a vehicle speed of thirty-five miles per hour or over.

A second, very important application of my invention, relates to its use for determining the true speed of aircraft relative to the surface of the earth. I am aware that somewhat similar methods for determining the rate of travel of aircraft have already been devised, such as disclosed in the C. W. Rice Patent No. 2,193,361, wherein an ultra high frequency electro-magnetic wave is propagated at a known angle from the aircraft toward the earth from which it is reflected and received in a radio receiver located on the aircraft. The received wave is beaten against the transmitted wave and the frequency of the resultant beat is used in conjunction with the known angle of transmission and reception to indicate the velocity of the aircraft. However, the successful use of this method depends upon the concentration of the transmitted and received waves in a highly directive beam in order that the angle between the direction of flight and the direction of wave propagation may be established, and that the area of the spot on the earth or reflecting body be as small as possible.

The present invention, in so far as its use on aircraft is concerned, is novel in that a known angle of wave propagation and reception is not required, wherefore, the need for expensive, cumbersome, highly directive transmitting and receiving equipment may be dispensed with without sacrificing reliability or accuracy of performance.

Figure 7:
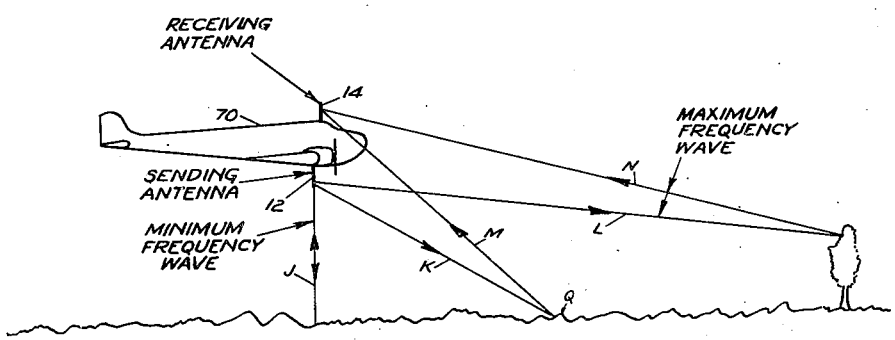
Fig. 7 is a schematic diagram illustrating the use of the present device for determining the ground speed of an aircraft.

When used to indicate the speed of aircraft, it is preferable to locate the radio transmitter, receiver and speed indicator on the craft, at any convenient location. As illustrated in Fig. 7, an aircraft 70 may be provided with a transmitting antenna 12 and a receiving antenna 14, the radio waves emanating from antenna 12 being propagated in all directions, some of which are indicated by the letters J, K and L. It will be observed that the frequencies will be a maximum for those waves which are reflected from objects which are most nearly in line with the direction of flight of the aircraft. One such maximum frequency reflected wave is indicated by the letter N. By the same token, it will be noted that the frequency of those waves reflected from objects normal to the direction of flight will be a minimum. Such a minimum frequency wave is indicated by the letter J. It will be observed that transmitted wave K, which is illustrated as being reflected as wave M from object Q, will have a frequency intermediate the maximum frequency wave N and the minimum frequency wave J.

When the various reflected waves are beaten against each other, a multitude of beat frequencies will be produced in the receiver, ranging from zero up to a certain maximum. The maximum frequency is preferably isolated from the lower frequencies by means of the filter circuit disclosed in Fig. 1, whereby the frequency or speed indicator 21 will be actuated by the maximum frequency being reflected at a particular time.

Preferably, the maximum and minimum received frequencies are employed to produce the used beat note, wherefore, the reading on the speed indicator will indicate the true speed of the aircraft regardless of the particular inclination between the craft and the earth. It will be noted that in the event of a power dive, or the like, reflected wave N would assume a minimum frequency, whereas wave J would assume a maximum frequency, which when beaten against wave N would indicate the true rate of speed with which the aircraft was approaching the earth.

Figure 6:
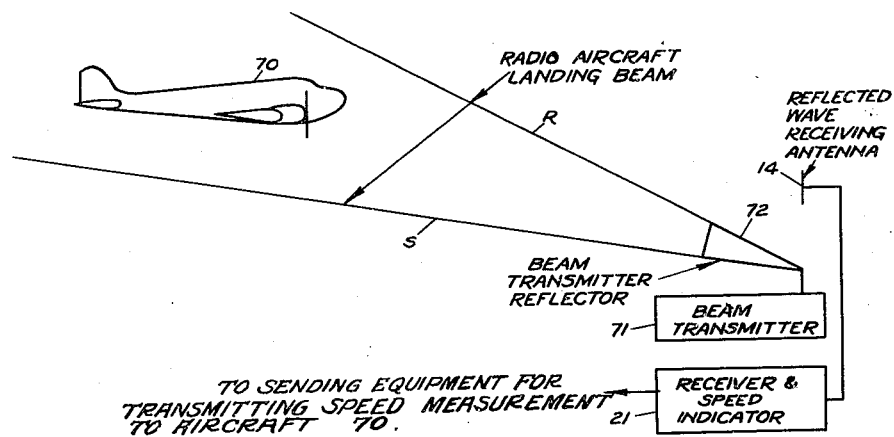
Fig. 6 is a schematic diagram illustrating the present device applied to a so-called radio-beam aircraft landing system.

With reference now to Fig. 6, it will be observed that I have applied my method of determining the speed of aircraft to the technique of landing such craft on a so-called radio beam, denoted generally by the letters R and S. This beam may be generated and transmitted by means of suitable equipment such as a commercial beam transmitter 71 and a beam transmitter reflector 72. If desired, the transmitted radio beam R and S may serve both as the beam for landing and as the source of radiation from which the speed of the aircraft will be indicated. The antenna 14 of the combined receiver and speed indicator device 21 may be located so as to receive a sufficient direct radiation or reflection from fixed objects to provide a satisfactory beat note which may be used to operate a speed indicating element of receiver device 21 at the airport where the desired speed information could be relayed to the approaching aircraft either verbally via radio, or by electrical signal currents for operating a speed indicating device on the aircraft 70. If desired, the speed indication could be transmitted directly to the aircraft without the use of a speed indicator at the airport.

The hereinabove described embodiment could likewise be used in those instances where beam landing is not employed. In such instances, the radio transmitter 71 could be made broadly directive so as to strengthen radiation above the horizon. As in other applications of the invention, a beat note would be produced in a radio receiver when an object moves into the electro-magnetic field of the transmitter. The beat note produced in the receiver would then be an indication of the velocity component toward the antenna 14 rather than the true velocity of the aircraft. However, it should be understood that this component of velocity could be translated into the true velocity of the aircraft with the aid of a direction finder. That is, given the velocity component in a known direction with respect to the direction in which the aircraft is headed, the velocity in the direction in which the aircraft is headed can easily be determined.

Figure 10:
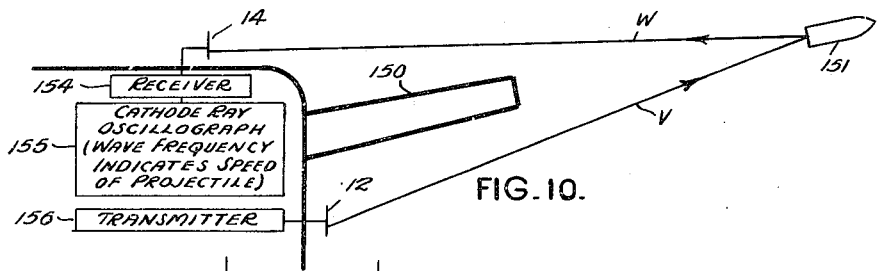

Still another practical embodiment of my invention would be its use in determining the muzzle velocity of shells, especially the muzzle velocity of guns on naval vessels and the like. As illustrated in Fig. 10, the method employed would be quite similar to that used in determining the speed of vehicular traffic, except that a very high speed frequency or velocity indicating device, such as a cathode ray oscillograph 155, would be used in place of the speed indicator 21 hereinabove described. The speed or velocity of projectile 151 will be indicated by the wave frequency as registered on the cathode ray oscillograph 155.

Transmitter 156 may be substantially similar to the high frequency oscillator 11 of Fig. 4, and receiver 154 may be substantially similar to the high frequency receiver 13 of Fig. 4. The wave transmitted or propagated from antenna 12 of transmitter 156 is indicated by the letter V whereas the reflected wave which is received by antenna 14 of receiver 154 is indicated by the letter W. The antennae 12 and 14 would, preferably, be located close to and behind the barrel 150 of the particular gun whose muzzle velocity is being determined.

From the foregoing, it will be observed that I have provided methods of and fully automatic, non-mechanical means for indicating the relative rate of travel between different bodies. It will be observed that in those instances where vehicular speeds are being indicated by the use of directive loops A and B, Fig. 4, the speed of the fastest moving vehicle regardless of its direction of travel, will be indicated on indicator 21, by reason of the operating characteristics of the circuit of Fig. 1. Such a device makes it possible and practicable to accurately patrol the speed of vehicular traffic without the necessity of using a separate device for each lane and/or direction of traffic. If desired, suitable ticket punching means denoted generally by the numeral 100 may be connected to indicator 21 whereby tangible evidence of vehicular speeds over the lawful rate would be instantly available, thereby eliminating the human and grudge elements which unfortunately too often influence and hamper the fair and just operation of the present day "speed traps."

As has already been indicated, in some cases it may be preferable to employ a filter network having more than one inductance, any or all of which may be controlled by direct current. For example, consider a "T" filter of the type known to the art as a constant K type filter similar to filter 44 in Fig. 1, except that the condenser 90 which is in series with inductance 60 is omitted.

Figure 8:
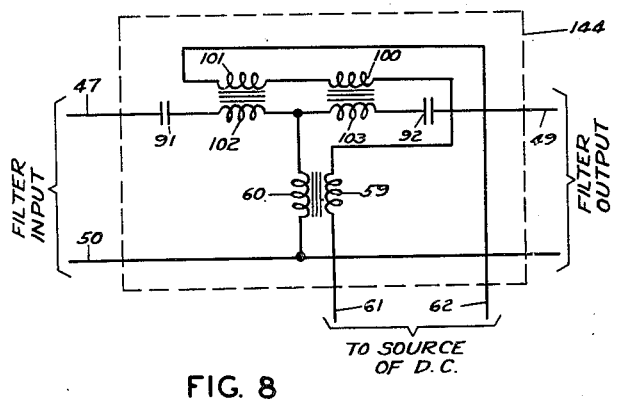
Fig. 8 is a schematic wiring diagram of an electric filter circuit embodying the present invention of the type known as a "T" filter which is known to the art as a constant "K" filter.

The resistance of the load which is to be connected to this filter should be equal to the square root of the inductance divided by the capacity. In Fig. 1, the load is represented by the input of the amplifier 46. Since this will remain constant as the filter characteristics are varied, it is obvious that the ratio of inductance to capacity should also remain constant, or, as the inductance is varied, the capacity would also be varied. This can be done indirectly by adding inductances 102 and 103, in series with each of condensers 91 and 92, and controlling the added inductance, as shown in Fig. 8. The reactances of these new arms would be capacitative within the frequency range for which the filter is designed, and its numerical value would be that required to maintain a constant value of the desired load resistance.

Figure 9:
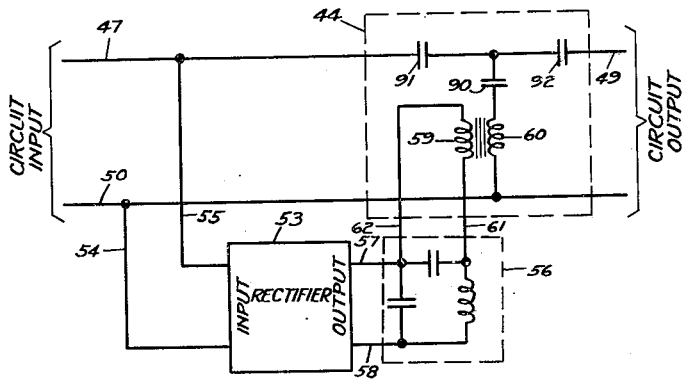
Fig. 9 is a schematic wiring diagram embodying the present invention wherein the filter input is utilized for deriving direct current for controlling the characteristics of filter 44.

It may in some cases be desirable to employ the variable filter herein described in a circuit where the controlling direct current is derived from the input to the filter. In this case the characteristics of the filter would be independent of the suppression afforded by that filter, but would depend upon the impressed signal. Such an arrangement is illustrated in Fig. 9, wherein the functions of the various circuit elements are the same as those for Fig. 1 except that instead of utilizing the amplified filter output for deriving the direct current for controlling the filter, the filter input is employed. By this means, the passed band width, its maximum, or its minimum frequencies can be controlled by the voltage and/or frequencies of the impressed wave.

It should be understood that various modifications and changes in the structural details of the device may be made, within the scope of the appended claims, without departing from the spirit of the invention.

What is claimed is:

1. The method of determining the relative velocity between two bodies which includes radiating electromagnetic waves in all directions from one of said bodies and then receiving said waves from any or all directions on said body after being reflected from a plurality of points on the other body and then determining said velocity from the maximum difference in the frequencies of the radiated and received waves.

2. The method of determining the relative velocity between two bodies which includes radiating ultra high frequency electromagnetic waves in all directions from one of said bodies and then receiving said waves from any or all directions on said body after being reflected from a plurality of points on the other body and then determining said velocity from the maximum difference in the frequencies of the radiated and received waves.

3. The method of operating a frequency indicator on but one of a number of impressed frequency components of an impressed wave, which comprises suppressing all but the maximum or minimum frequency components of the impressed wave and of using that frequency component to operate the frequency indicator.

4. In a speed indicating system for moving objects, the combination which comprises means for radiating electromagnetic waves in any or all directions from one body which waves are intercepted and reflected by objects both moving and stationary relative to said body, other means located on said body for receiving from any or all directions and beating said reflected waves against each other to produce a beat frequency, and means responsive to and operable by said beat frequency for translating said beat frequency into a velocity indication.

5. In a speed indicating system for moving objects, the combination which comprises means for radiating electromagnetic waves from one body which waves are adapted to be intercepted and reflected by objects both moving and stationary relative to said body, other means located on said body for receiving and beating said reflected waves against each other to provide beat frequencies, means for discriminating against all but the maximum beat frequency, and means responsive to and operable by said maximum beat frequency for translating said maximum beat frequency into velocity, said velocity being that of the fastest moving object intercepting and reflecting said waves.

6. The method of determining the relative velocity between objects moving relative to one another which includes radiating electromagnetic waves from one of said bodies in all directions, and then receiving from any or all directions a portion of the waves on said body after being reflected from various other bodies both moving and stationary relative to said body, and then determining said velocity from the difference between the maximum and minimum frequencies of the received waves.

7. In a speed indicating system for moving objects, the combination which comprises means for radiating electromagnetic waves which are adapted to be intercepted and reflected by objects both moving and stationary relative to said means, other means for receiving and beating said reflected waves against each other to provide beat frequencies said receiving means being stationary relative to said radiating means, means for discriminating against all but the maximum beat frequency, said means comprising a filter adapted to automatically and continually suppress substantially all frequency components of said beat frequency except the maximum frequency component of said beat frequency and means controlled by the intensity of the unsuppressed frequency component for varying the characteristics of the filter whereby the relative suppression is varied directly as the filter output is increased, and means responsive to and operable by said maximum beat frequency for translating said maximum beat frequency into velocity, said velocity being that of the fastest moving object intercepting and reflecting said waves.

8. The method of determining the relative velocity between two bodies which includes radiating electromagnetic waves in certain directions from one of said bodies and then receiving from certan directions said waves on said body after being reflected from a plurality of points on the other body and then determining said velocity from the maximum difference in the frequencies of the radiated and received waves.

9. The method of determining the relative velocity between two bodies which includes radiating ultra high frequency electromagnetic waves in certain directions from one of said bodies and then receiving from certain directions said waves on said body after beng reflected from a plurality of points on the other body and then determining said velocity from the maximum difference in the frequencies of the radiated and received waves.

10. The method of indicating the ground speed of an aircraft moving in and along the path of a radio landing beam, which method comprises the steps of transmitting radio landing beam waves, of receiving said radio landing beam waves after being reflected from aircraft moving in and along the path of said radio landing beam, and from objects stationary relative to the means of transmission of said radio landing beam waves, wherein the means for receiving said reflected waves are stationary with respect to said means of transmission, and of then beating said reflected waves against each other for determining the velocity of said aircraft.

HENRY SUTER.